US011044231B2

(12) United States Patent
Renpenning et al.

(10) Patent No.: US 11,044,231 B2
(45) Date of Patent: Jun. 22, 2021

(54) ASSEMBLY FOR CHECKING AT LEAST ONE FIREWALL DEVICE, AND METHOD FOR PROTECTING AT LEAST ONE DATA RECEIVER

(71) Applicant: SIEMENS AKTIENGESELLSCHAFT, Munich (DE)

(72) Inventors: Frank Renpenning, Braunschweig (DE); Matthias Seifert, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 60 days.

(21) Appl. No.: 16/092,468

(22) PCT Filed: Mar. 13, 2017

(86) PCT No.: PCT/EP2017/055805
§ 371 (c)(1),
(2) Date: Oct. 10, 2018

(87) PCT Pub. No.: WO2017/178165
PCT Pub. Date: Oct. 19, 2017

(65) Prior Publication Data
US 2019/0166097 A1    May 30, 2019

(30) Foreign Application Priority Data
Apr. 11, 2016  (DE) .......................... 102016205983.1

(51) Int. Cl.
G06F 21/00     (2013.01)
H04L 29/06     (2006.01)
H04L 29/14     (2006.01)

(52) U.S. Cl.
CPC ...... H04L 63/0245 (2013.01); H04L 63/0218 (2013.01); H04L 63/1416 (2013.01); H04L 63/20 (2013.01); H04L 69/40 (2013.01)

(58) Field of Classification Search
CPC ............ H04L 63/0245; H04L 63/0218; H04L 63/1416; H04L 63/20; H04L 69/40
(Continued)

(56) References Cited
U.S. PATENT DOCUMENTS 7,315,537 B2 * 1/2008 Klaghofer ......... H04L 29/06027
                                                              370/352
9,979,695 B2    5/2018 Bloecher et al.
(Continued)

FOREIGN PATENT DOCUMENTS

CN     101026510 A    8/2007
CN     102420767 A    4/2012
(Continued)

*Primary Examiner* — Josnel Jeudy
(74) *Attorney, Agent, or Firm* — Laurence Greenberg; Werner Stemer; Ralph Locher

(57)    ABSTRACT

An assembly checks at least one firewall device and a method protects at least one data receiver. In the method, permissible and non-permissible data traffic is differentiated in data traffic in the direction of the data receiver using specific rules. Non-permissible data traffic is blocked, and permissible data traffic is allowed through. In order to check the function of the firewall device, the data traffic which has been allowed through is interrupted if the data traffic which has been allowed through has non-permissible data traffic.

19 Claims, 1 Drawing Sheet

(58) Field of Classification Search
USPC .......................................................... 726/13
See application file for complete search history.

(56) References Cited

U.S. PATENT DOCUMENTS

| | | | |
|---|---|---|---|
| 2002/0129355 A1* | 9/2002 | Velten | G06F 11/3093 717/176 |
| 2005/0005031 A1* | 1/2005 | Gordy | H04L 63/1408 709/250 |
| 2005/0075842 A1* | 4/2005 | Ormazabal | H04L 63/1433 702/188 |
| 2005/0076235 A1 | 4/2005 | Ormazabal et al. | |
| 2005/0268332 A1* | 12/2005 | Le | H04L 63/0263 726/11 |
| 2006/0005231 A1* | 1/2006 | Zuk | H04L 63/1416 726/3 |
| 2008/0040788 A1* | 2/2008 | Steinkogler | G06F 19/3418 726/11 |
| 2009/0296571 A1* | 12/2009 | McCourt | H04L 41/06 370/225 |
| 2010/0005263 A1* | 1/2010 | Wu | H04L 67/1095 711/162 |
| 2016/0248679 A1* | 8/2016 | Blocher | H04L 47/28 |

FOREIGN PATENT DOCUMENTS

| | | |
|---|---|---|
| CN | 104252398 A | 12/2014 |
| DE | 102013214522 A1 | 1/2015 |
| DE | 102013216847 A1 | 2/2015 |
| DE | 102013221955 A1 | 5/2015 |
| EP | 2154827 A1 | 2/2010 |

* cited by examiner

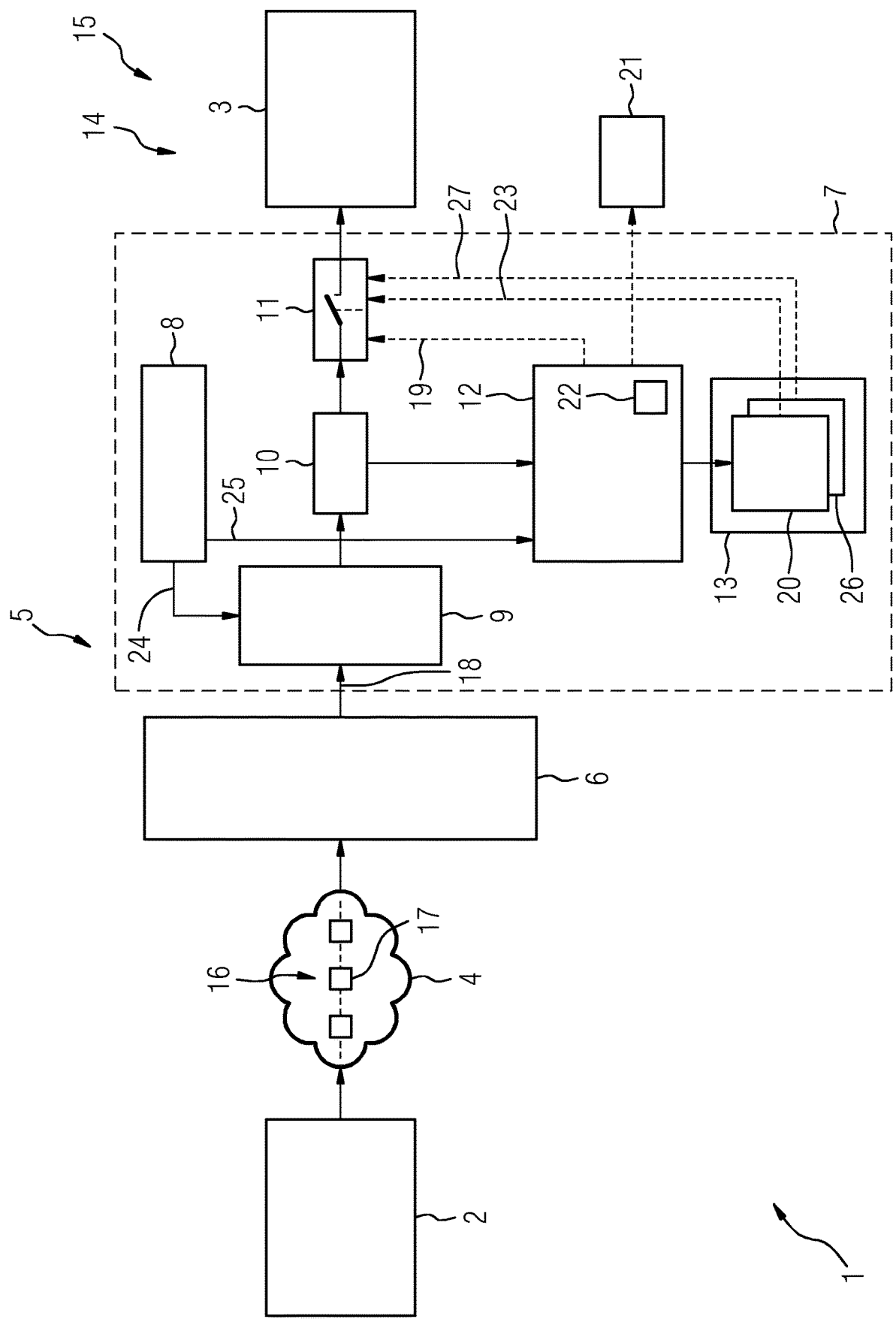

ASSEMBLY FOR CHECKING AT LEAST ONE FIREWALL DEVICE, AND METHOD FOR PROTECTING AT LEAST ONE DATA RECEIVER

BACKGROUND OF THE INVENTION

Field of the Invention

The invention relates to an assembly for checking at least one firewall device which is embodied to differentiate between permissible and non-permissible data traffic in the direction of a data receiver on the basis of predetermined rules, as well as to block non-permissible data traffic and to allow through permissible data traffic.

The invention further relates to a method for checking at least one firewall device, wherein permissible and non-permissible data traffic in a stream of data traffic transmitted in the direction of a data receiver are differentiated on the basis of predetermined rules and wherein non-permissible data traffic is blocked and permissible data traffic is allowed through.

Safety-critical systems, such as the signaling network of a railroad system, for example, or a network inside a nuclear power station, often have special security zones to which no direct data access is possible. There is nonetheless an increasing demand for a means of remote access to the system elements contained in said security zones, for example to carry out a remote maintenance activity. For this reason there exists a desire to network safety-related systems with conventional IT systems. In order to enable such a secure access to safety-critical systems, firewall devices are known which block non-permissible data traffic in the direction of a data receiver residing inside a safety-critical system. Since different monitoring requirements apply in safety-related environments than in the normal IT domain or in the field of office IT security, known firewall devices are not adequate to the task of handling the data traffic with data receivers in a safety-related environment.

SUMMARY OF THE INVENTION

It is therefore the object of the present invention to provide an assembly and a method of the type cited in the introduction by means of which a data receiver located in a safety-related environment is protected by means of a firewall device and the requirements of a safety-related environment are fulfilled.

The present invention achieves this object in that the assembly cited in the introduction comprises at least one acquisition device, which is embodied to acquire the data traffic allowed through by the firewall device, and at least one evaluation device, which is embodied to check the data traffic acquired by the acquisition device on the basis of the predetermined rules.

With regard to the method cited in the introduction, the invention achieves the object in that the data traffic that has been allowed through is acquired and checked for any non-permissible data traffic present.

The solution according to the invention has the advantage that confirmation of the proper functioning of the firewall device is provided by a checking of the data traffic allowed through by the firewall device and consequently also a deployment of the latter for safety-related environments is permitted.

A security gateway having a failure disclosure is in fact described in DE 10 2013 221 955 A1, for example. Therein, a check takes place to establish whether the incoming and outgoing data of a VPN gateway are erroneously identical, i.e. no encryption takes place. However, an analysis to determine whether the firewall itself has been reconfigured as a result of an attack cannot be carried out by this means.

The solution according to the invention can be developed by means of advantageous embodiments which are described herein below.

Thus, the assembly can comprise at least one shutdown device which is embodied to interrupt the data traffic in the direction of the data receiver and can be activated at least by the evaluation device. This has the advantage that the data traffic to the data receiver can be interrupted if the evaluation device detects a malfunction of the firewall device. Said malfunction manifests itself by the presence of non-permissible data traffic in the data traffic which has been allowed through by the firewall device in the direction of the data receiver and which is acquired and checked by the evaluation device. The data receiver can be effectively protected against non-permissible data traffic by means of the shutdown device. It is a basic requirement in safety-related systems that failures and malfunctions must not be allowed to expose such systems to threats. This is ensured by means of the shutdown device which can be activated by the evaluation device. Failures of the firewall device can consequently not lead to a situation where the filtering of the data traffic ceases and as a result inadmissible messages are able to pass through to the data receiver. In the safety-related domain, in a railroad application for example, an explicit safety case must be maintained by means of which it must be demonstrated among other things for all failures that they culminate in a safe state. This requirement is ensured by the inventive solution of this embodiment variant. By means of this embodiment variant of the invention it is also possible for office IT security components, for example the firewall device, to be used for a network connection between a secure network and an insecure network.

In a further advantageous embodiment, the assembly can comprise at least one monitoring device which is connected to the evaluation device and is embodied for monitoring an operational readiness of the evaluation device. This has the advantage that a failure of the evaluation device does not go unnoticed, but is detected by the monitoring device and enables appropriate measures to be introduced. In an advantageous development, the monitoring device can therefore be embodied to activate the shutdown device if it is discovered that a state of operational readiness does not exist. In this way it is ensured that data traffic to the data receiver is shut down in the event of an identified malfunction, which represents the fulfillment of the so-called "fail close" requirement.

In order to produce a particularly secure embodiment variant of the invention, the monitoring device can be embodied as a separate unit from the evaluation device. In this case at least the monitoring device and the evaluation device, for example, are realized on independent hardware components. Furthermore, the monitoring device can be embodied to initiate a restart of the evaluation device if it is detected that a state of operational readiness does not exist. This has the advantage that the level of security is increased further. The monitoring device can be embodied for example as a hardware component known as a watchdog timer which is reset at regular intervals by the internal processes of the evaluation device. If this reset does not happen within a predetermined time, known as a timeout time, an alarm is triggered, which alarm is signaled centrally, for example, and can trigger the shutdown device and consequently interrupt the data traffic to the data receiver. The evaluation device is subsequently restarted in a secure manner (Secure Boot). A program code and a configuration of the evaluation device can be stored in a memory configured as read-only so that the initial state can be reestablished at the restart and in this way a previous manipulation or malfunction of the evaluation device is reversed. During said restart and the detection of the fault by the monitoring device, the data traffic to the data receiver is advantageously interrupted by the shutdown device. Furthermore, a restart of the evaluation device can also be performed at regular intervals and/or if anomalies are detected in order to further increase the security of the assembly.

The evaluation device can additionally comprise a monitoring function at the input in order to ensure that packets in the data traffic that have been intentionally altered in length or in some other way also do not adversely affect the evaluation device in its function. In this case the data packet length is detected by the evaluation device and if a parameterizable maximum length is exceeded and/or also if a minimum length is exceeded, an alarm is triggered and the data traffic is interrupted by the shutdown device. In addition, the presence and the applicability of the protocol elements of the data packet can be checked.

In a further advantageous embodiment, the assembly can comprise at least one test data generator which is embodied to generate test data traffic including non-permissible data traffic in the direction of the data receiver. This has the advantage that the function of the evaluation device is also checked in the case of a correctly functioning firewall device. The test data traffic can be reported and displayed to the evaluation device by the test data generator and therefore be expected by the evaluation device so that no alarm or any other protective response needs to be triggered. The test data traffic can for example be inserted at regular intervals into the data stream to the data receiver and checks the correct functioning of the evaluation device. The detection of the test data traffic can reset a further watchdog timer of the monitoring device which, in the event that the expected test data traffic is not detected or fails to materialize, triggers an alarm and/or activates the shutdown device and consequently interrupts the data traffic to the data receiver.

The invention further relates to a protection device for protecting at least one data receiver belonging to a network having high security requirements against non-permissible data traffic, said protection device comprising at least one firewall device which is embodied to differentiate between permissible and non-permissible data traffic in the direction of the data receiver on the basis of predetermined rules, as well as to block non-permissible data traffic and to allow through permissible data traffic. In order to ensure a high level of security and fulfill requirements of a safety-related environment, the protection device comprises at least one assembly according to one of the above-cited embodiment variants.

The invention also relates to a network connection between a data transmitter and a data receiver, wherein the data receiver belongs to a network having high security requirements and the data transmitter sending data traffic belongs to a network having low security requirements. In order to increase the level of security and fulfill requirements of a safety-related environment, it is provided according to the invention that the network connection comprises at least one protection device according to the above-cited embodiment variant.

In an advantageous embodiment of the method according to the invention, the data traffic to the data receiver can be interrupted if the allowed-through data traffic includes non-permissible data traffic. This has the advantage that a so-called failsafe function is fulfilled, which must be guaranteed in environments where increased security requirements apply, as already described hereinabove.

The data traffic to the data receiver can furthermore be interrupted if the process of allowing through and checking the allowed-through data traffic is not completed within a predetermined time. By means of this watchdog timer function already described above, the proper functioning of the method according to the invention is checked at regular intervals, as likewise already described hereinabove.

In order to further increase the security of the method according to the invention, allowed-through test data traffic that includes non-permissible data traffic can be generated and a check carried out to determine whether the non-permissible data traffic is detected. Furthermore, the data traffic to the data receiver can be interrupted if the non-permissible data traffic of the test data traffic is not detected within a predetermined time or the test data traffic is not generated within a predetermined time. Manipulations are detected by means of said watchdog timer function and lead to the automatic interruption of the data traffic.

Finally, the data traffic can be transmitted using an end-to-end encryption scheme in order to ensure the integrity of the transmitted data in terms of its content and, where necessary, its confidentiality. In this case the decryption takes place in the data receiver, which can additionally check the content in respect of plausibility. The advantage of the solution according to the invention comes into play in particular in the case of end-to-end encrypted data, since such messages cannot be used with known security gateways, for example.

The invention is described below with reference to the attached drawing and the exemplary embodiment variant illustrated therein.

BRIEF DESCRIPTION OF THE DRAWING

The FIGURE shows a schematic view of an exemplary embodiment variant of a network connection according to the invention.

DESCRIPTION OF THE INVENTION

An inventive network connection 1 extends from a data transmitter 2 to a data receiver 3. The network connection 1 comprises an IP network 4 and an inventive protection device 5, which is arranged upstream of the data receiver 3 and protects the latter against non-permissible data traffic.

The protection device 5 comprises a firewall device 6 and an inventive assembly 7, which is embodied to check the firewall device 6.

The inventive assembly 7 comprises a test data generator 8, a distribution means 9, an acquisition device 10, a shutdown device 11, an evaluation device 12, and a monitoring device 13.

In the exemplary embodiment variant illustrated in the FIGURE, the data receiver 3 is arranged inside a security zone 14 of a safety-critical system 15. The safety-critical system 15 is a railroad engineering facility or a power station, for example, and the security zone 14 is an environment in which an increased level of security applies in respect of data traffic. For example, the requirements of the IEC 62443-3-3 standard are applicable to a possible remote access from outside to said environment.

The data transmitter 2 is located outside of the security zone 14 of the safety-critical system 15 in an area having a lower security requirement than applies in the security zone 14. The inventive network connection 1 between the data transmitter 2 and the data receiver 3 is used for example for remote maintenance of the safety-critical system 15. The IP network 4, via which the network connection 1 is established, is the internet or another data network, for example.

In order to protect the data receiver 3 against non-permissible data traffic, the firewall device 6 is arranged upstream of the data receiver 3 in the data traffic in the direction of the data receiver 3.

The firewall device 6 applies predetermined rules in order to differentiate between permissible and non-permissible data traffic, the non-permissible data traffic being blocked and consequently filtered out by the firewall device 6 in order to protect the data receiver. The remaining, permissible data traffic is allowed through and is able to make its way to the data receiver 3. Here, in the exemplary embodiment variant, the data traffic 16 contains end-to-end encrypted data 17 for the data receiver 3. The permissible data traffic comprises data 17 that may be sent from one or more permissible IP addresses to precisely one or more permissible IP addresses at the data receiver 3. The protocol elements required for the transmission are located unencrypted at the start and at the end of the data 17 in order to ensure a standard-compliant transfer via the IP network 4, and in addition in encrypted form inside the data 17. The predetermined rules on the basis of which the firewall device 6 differentiates between permissible and non-permissible data traffic are consequently in this case valid IP addresses for the data transmitter 2 and the data receiver 3. In the case of correct configuration, the firewall device 6 therefore admits only permissible data traffic into the security zone 14 in the direction of the data receiver 3. However, the firewall device 6 may have been modified illegally due, for example, to a hostile attack, with the result that it also allows non-permissible data traffic to pass through. Such a fault scenario involving the firewall device 6 is possible and should therefore be prevented according to the invention.

According to the invention, the inventive assembly 7 is provided between the firewall device 6 and the data receiver 3 in order to check the correct functioning of the firewall device 6.

The data traffic 18 allowed through by the firewall device 6 is first acquired by the acquisition device 10 inside the assembly 7. The acquisition device 10 is embodied for example as a monitoring device, also known as a tap, which nonreactively monitors the allowed-through data traffic 18. The monitored allowed-through data traffic 18 is checked by the evaluation device 12 connected to the acquisition device 10. During the check by the evaluation device 12, it is also checked that the allowed-through data traffic 18 includes no non-permissible data traffic. If non-permissible data traffic, i.e. non-permissible IP sender addresses or non-permissible IP destination addresses, port numbers, etc., is detected, only a malfunction of the firewall device 6 can be the cause. In such a fault situation, the evaluation device 12 activates the shutdown device 11 by way of an appropriate shutdown signal 19.

The shutdown device 11 is embodied to interrupt the data traffic in the direction of the data receiver 3 and operates accordingly like a switch which, when activated, interrupts the data traffic to the data receiver 3. By means of the shutdown signal 19 from the evaluation device 12 it is ensured that non-permissible data traffic detected in the allowed-through data traffic 18 does not reach the data receiver 3 and the security zone 14. In the exemplary embodiment variant shown in the FIGURE, the evaluation device 12 is embodied such that it is configured locally only and possesses no additional bidirectional network connection. Potential attacks against the evaluation device 12 are minimized as a result and the level of security is increased by means of the assembly 7 according to the invention.

The monitoring device 13 is also connected to the evaluation device 12, the monitoring device 13 being implemented on hardware that is independent of the evaluation device 12. The monitoring device 13 comprises a first watchdog timer 20, which is reset by the evaluation device 12, for example by the latter's internal processes, at regular time intervals. If, for example, the evaluation device 12 is disabled as a result of a hostile attack, the watchdog timer 20 is not reset and reaches a predetermined timeout time. When said timeout time is reached, an alarm 21 is triggered by the evaluation device 12 and in addition the shutdown signal 19 is output to the shutdown device 11. As a result, the fault situation affecting the evaluation device 12 leads to the interruption of the data traffic in the direction of the data receiver 3 and thus advantageously to a safe state. The alarm 21 can for example be triggered in a control center (not shown) of the safety-critical system 15.

After the triggering of the alarm 21, a restart is automatically initiated in the evaluation device 12 in the embodiment variant shown by way of example in the FIGURE in order to reinstate the security of the system. The evaluation device 12 comprises a read-only memory 22 which contains a program code and a configuration of the evaluation device 12. At the restart of the evaluation device 12, said program code and the configuration are read out from the memory 22 in order to reestablish the initial state of the evaluation device 12 and thereby nullify a previous manipulation or malfunction of the evaluation device 12. During the detected malfunction and the restart of the evaluation device 12, the data traffic remains interrupted by the shutdown device 11 and is not released again until after the shutdown signal 23 has been revoked by the watchdog timer 20. In addition, in the exemplary embodiment variant shown in the FIGURE, the restart of the evaluation device 12 is performed at regular intervals and automatically if anomalies are detected.

It can furthermore be ensured by way of a monitoring function at the input of the evaluation device 12 that data 17 that has been intentionally altered in length or in some other way in the data traffic 18 also does not adversely affect the evaluation device 12 in its function. In this case, the data packet length is detected by the evaluation device 12 and if a parameterizable maximum length is exceeded and/or also if a minimum length is exceeded, an alarm is triggered and the data traffic is interrupted by the shutdown device 11. In addition, the presence and the applicability of the protocol elements of the data packet can be checked.

The test data generator 8 according to the invention is provided in order to allow regular checks on the proper functioning of the inventive assembly 7. The test data generator 8 generates one or more defined sets of test data at regular intervals in test data traffic 24. The test data traffic 24 is fed into the allowed-through data traffic 18 in the direction of the data receiver 3 by means of the distribution means 9, which is a switch, for example. The test data traffic 24 includes non-permissible data traffic, which reaches the acquisition device 10. This enables the proper functioning of the acquisition device 10 and the evaluation device 12 to be checked.

The test data generator 8 is directly connected to the evaluation device 12 and outputs a test data signal 25 when the test data traffic 24 has been fed into the allowed-through data traffic 18. As a result, the evaluation device 12 expects the non-permissible data traffic fed in for test purposes in the allowed-through data traffic 18 and therefore does not trigger an alarm 21 and does not activate the shutdown device 11.

The test data traffic 24 is generated for example at regular intervals by the test data generator 8 in order to check the correct functioning of the evaluation device 12. The detection of the test data traffic 24 by the evaluation device 12 resets a further watchdog timer 26 of the monitoring device 13. If the test data traffic 24 is not detected by the evaluation device 12 within a specified timeout time of the watchdog timer 26, the alarm 21 is triggered and in addition or alternatively a shutdown signal 27 is transmitted to the shutdown device 11, the data traffic to the data receiver 3 being interrupted due to said shutdown signal 27.

The evaluation device 12 according to the invention can largely evade an external attack because it is connected to the data traffic via the acquisition device 10 only, and this also only by means of a unidirectional, read-only tap. Even if the evaluation device 12 is deactivated by suitable data traffic, the monitoring device 13 would trigger the shutdown device 11 via the watchdog timers 20 and 26. If the evaluation device 12 were to be deactivated by an attack, this will become evident already with the next test data traffic 24, which will likewise cause the shutdown device 11 to be activated. A detrimental configuration change to the firewall device 6 is detected by means of the assembly 7 according to the invention because non-permissible data traffic that is allowed through is detected and blocked by the shutdown device 11. Advantageously, end-to-end encrypted data 17 can also be transmitted via the network connection 1 according to the invention.

The invention claimed is:

1. An assembly for checking at least one firewall device embodied to differentiate between permissible data traffic and non-permissible data traffic in a direction of a data receiver on a basis of predetermined rules, as well as to block the non-permissible data traffic and to allow through the permissible data traffic, the assembly comprising:
at least one acquisition device embodied to acquire data traffic allowed through by the firewall device;
at least one evaluation device embodied to check the data traffic acquired by said acquisition device on a basis of the predetermined rules; and
at least one test data generator embodied to generate test data traffic including the non-permissible data traffic in the direction of the data receiver;
said evaluation device configured such that when the test data traffic is not detected by said evaluation device within a timeout time specified by a watchdog timer, said evaluation device performs at least one operation selected from the group consisting of: triggering an alarm, and transmitting a shutdown signal to a shutdown device, wherein the shutdown signal causes the data traffic to the data receiver to be interrupted.

2. The assembly according to claim 1, further comprising at least one shutdown device embodied to interrupt the data traffic in the direction of the data receiver and to be activated by said at least one evaluation device.

3. The assembly according to claim 2, further comprising at least one monitoring device connected to said evaluation device and embodied for monitoring an operational readiness of said evaluation device.

4. The assembly according to claim 2, wherein said monitoring device is embodied to activate said shutdown device when it is discovered that a state of operational readiness does not exist.

5. The assembly according to claim 3, wherein said monitoring device is embodied as a separate unit from said evaluation device.

6. The assembly according to claim 3, wherein said monitoring device is embodied to initiate a restart of said evaluation device when it is discovered that a state of operational readiness does not exist.

7. A protection device for protecting at least one data receiver belonging to a network having high security requirements against non-permissible data traffic, the protection device comprising:
at least one firewall device embodied to differentiate between permissible data traffic and the non-permissible data traffic in a direction of the data receiver on a basis of predetermined rules, as well as to block the non-permissible data traffic and to allow through the permissible data traffic;
an assembly having at least one acquisition device embodied to acquire data traffic allowed through by said firewall device and at least one evaluation device embodied to check the data traffic acquired by said acquisition device on a basis of the predetermined rules; and
at least one test data generator embodied to generate test data traffic including the non-permissible data traffic in the direction of the data receiver;
said evaluation device configured such that when the test data traffic is not detected by said evaluation device within a timeout time specified by a watchdog timer, said evaluation device performs at least one operation selected from the group consisting of: triggering an alarm, and transmitting a shutdown signal to a shutdown device, wherein the shutdown signal causes the data traffic to the data receiver to be interrupted.

8. A network connection disposed between a data transmitter and a data receiver, wherein the data receiver belongs to a first network having high security requirements and the data transmitter sending data traffic belongs to a second network having lower security requirements, the network connection comprising:
a protection device for protecting the data receiver, said protection device containing:
at least one firewall device embodied to differentiate between permissible data traffic and the non-permissible data traffic in a direction of the data receiver on a basis of predetermined rules, as well as to block the non-permissible data traffic and to allow through the permissible data traffic; and
an assembly having at least one acquisition device embodied to acquire the data traffic allowed through by said firewall device and at least one evaluation device embodied to check the data traffic acquired by said acquisition device on a basis of the predetermined rules; and
at least one test data generator embodied to generate test data traffic including the non-permissible data traffic in the direction of the data receiver;
said evaluation device configured such that when the test data traffic is not detected by said evaluation device within a timeout time specified by a watchdog timer, said evaluation device performs at least one operation selected from the group consisting of: triggering an alarm, and transmitting a shutdown signal to a shutdown device, wherein the shutdown signal causes the data traffic to the data receiver to be interrupted.

9. A method for checking at least one firewall device, which comprises the steps of:
determining a differentiation between permissible data traffic and non-permissible data traffic in data traffic in a direction of a data receiver on a basis of predetermined rules;
blocking the non-permissible data traffic;
allowing the permissible data traffic through;
acquiring allowed-through data traffic by an acquisition device;
checking the allowed-through data traffic with an evaluation device for any said non-permissible data traffic present on a basis of predetermined rules
with at least one test data generator, generating test data traffic including the non-permissible data traffic in the direction of the data receiver; and
when the evaluation device does not detect the test data traffic within a timeout time specified by a watchdog timer, the evaluation device performs at least one operation selected from the group consisting of: triggering an alarm, and transmitting a shutdown signal to a shutdown device, wherein the shutdown signal causes the data traffic to the data receiver to be interrupted.

10. The method according to claim 9, which further comprises interrupting the data traffic to the data receiver when the allowed-through data traffic includes the non-permissible data traffic.

11. The method according to claim 9, which further comprises interrupting the data traffic to the data receiver when a process of allowing through and checking the allowed-through data traffic is not completed within a predetermined time.

12. The method according to claim 9, which further comprises generating the allowed-through test data traffic that includes the non-permissible data traffic and a check is carried out to determine whether the non-permissible data traffic is detected.

13. The method according to claim 12, which further comprises interrupting the data traffic to the data receiver when the non-permissible data traffic of allowed-through test data traffic is not detected within a predetermined time or the allowed-through test data traffic is not generated within the predetermined time.

14. The method according to claim 9, which further comprises transmitting the data traffic using end-to-end encryption.

15. The method according to claim 9, wherein the evaluation device is connected to the data traffic only via the at least one acquisition device and only by way of a unidirectional read-only tap.

16. The network connection according to claim 8, wherein said at least one evaluation device is connected to the data traffic only via said at least one acquisition device and only by way of a unidirectional read-only tap.

17. The protection device according to claim 7, wherein said at least one evaluation device is connected to the data traffic only via said at least one acquisition device and only by way of a unidirectional read-only tap.

18. The assembly according to claim 1, wherein said at least one evaluation device is connected to the data traffic only via said at least one acquisition device and only by way of a unidirectional read-only tap.

19. The assembly according to claim 1, wherein:
said test data generator is configured to generate the test data traffic to check whether said evaluation device is functioning correctly;
said evaluation device is configured to reset a further watchdog timer of the monitoring device when said evaluation device detects the test data traffic; and
said evaluation device is configured such that when the test data traffic is not detected by said evaluation device within a further timeout time specified by said further watchdog timer, said evaluation device performs at least one operation selected from the group consisting of: triggering an alarm, and transmitting a shutdown signal to said shutdown device, wherein the shutdown signal causes the data traffic to the data receiver to be interrupted.

* * * * *